United States Patent
Lim et al.

(10) Patent No.: US 11,926,117 B2
(45) Date of Patent: Mar. 12, 2024

(54) MDO THERMORESISTANT HEAT-SHRINKABLE MULTILAYER FILM

(71) Applicant: SK CHEMICALS CO., LTD., Gyeonggi-do (KR)

(72) Inventors: Seol-Hee Lim, Seoul (KR); Sung-Gi Kim, Gyeonggi-do (KR); So-Yeon Kim, Daejeon (KR)

(73) Assignee: SK Chemicals Co., Ltd., Gyeonggi-do (KR)

(*) Notice: Subject to any disclaimer, the term of this patent is extended or adjusted under 35 U.S.C. 154(b) by 0 days.

(21) Appl. No.: 16/344,120

(22) PCT Filed: Nov. 24, 2017

(86) PCT No.: PCT/KR2017/013546
§ 371 (c)(1),
(2) Date: Apr. 23, 2019

(87) PCT Pub. No.: WO2018/097656
PCT Pub. Date: May 31, 2018

(65) Prior Publication Data
US 2019/0329538 A1    Oct. 31, 2019

(30) Foreign Application Priority Data
Nov. 24, 2016    (KR) .................. 10-2016-0157613

(51) Int. Cl.
*B29D 7/01* (2006.01)
*B32B 27/08* (2006.01)
(Continued)

(52) U.S. Cl.
CPC ............... *B29D 7/01* (2013.01); *B32B 27/08* (2013.01); *B32B 27/20* (2013.01); *B32B 27/36* (2013.01);
(Continued)

(58) Field of Classification Search
CPC ......... B32B 27/36; B32B 27/08; B32B 27/20; B32B 27/18; B32B 37/153;
(Continued)

(56) References Cited

U.S. PATENT DOCUMENTS

| 4,939,232 A | 7/1990 | Fukuda et al. |
| 4,987,187 A * | 1/1991 | Udipi ............... C08L 67/02 525/173 |

(Continued)

FOREIGN PATENT DOCUMENTS

| CN | 103172990 | 6/2013 |
| JP | H 04-344222 | 11/1992 |

(Continued)

OTHER PUBLICATIONS

Espacenet Translation of KR-20140092113-A (Year: 2020).*

(Continued)

*Primary Examiner* — Michael Zhang
(74) *Attorney, Agent, or Firm* — Sheridan Ross P.C.

(57) ABSTRACT

The present invention relates to an MDO thermoresistant heat-shrinkable multilayer film of a copolymer polyester having excellent thermal resistance. In particular, the present invention provides an MDO thermoresistant heat-shrinkable multilayer film that includes multiple skin layers capable of improving thermal resistance formed on a substrate layer capable of providing high shrinkage, and simultaneously has excellent thermal resistance and high shrinkage properties through MD orientation instead of the conventional TD orientation method.

5 Claims, 1 Drawing Sheet

1 - skin layer
2 - substrate layer

(51) Int. Cl.
*B32B 27/20* (2006.01)
*B32B 27/36* (2006.01)
*B32B 37/15* (2006.01)
*B32B 38/00* (2006.01)
*C08J 5/18* (2006.01)
*C08L 67/02* (2006.01)

(52) U.S. Cl.
CPC ........ *B32B 37/153* (2013.01); *B32B 38/0012* (2013.01); *C08J 5/18* (2013.01); *C08L 67/02* (2013.01); *B32B 2038/0028* (2013.01); *B32B 2307/306* (2013.01); *B32B 2307/516* (2013.01); *B32B 2307/736* (2013.01); *C08J 2367/02* (2013.01); *C08J 2467/02* (2013.01); *C08L 2201/08* (2013.01); *C08L 2203/16* (2013.01); *C08L 2205/025* (2013.01); *C08L 2205/03* (2013.01)

(58) Field of Classification Search
CPC ........ B32B 38/0012; B32B 2038/0028; B32B 2307/306; B32B 2307/516; B32B 2307/736; B32B 2307/734; B32B 2307/712; B32B 2264/102; B32B 2519/00; B32B 2250/40; B32B 2250/10; B32B 2250/02; B32B 2250/03; B32B 2250/244; C08J 5/18; C08J 2367/02; C08J 2467/02; C08L 67/02; C08L 2201/08; C08L 2203/16; C08L 2205/025; C08L 2205/03; B29L 2031/744; B29K 2105/02; B29K 2067/00; C08G 63/672; C08G 63/183; B29D 7/01; B29C 55/06
See application file for complete search history.

(56) References Cited

U.S. PATENT DOCUMENTS

| | | | |
|---|---|---|---|
| 5,958,581 A * | 9/1999 | Khanarian | C08G 63/672 428/357 |
| 6,025,061 A | 2/2000 | Khanarian et al. | |
| 6,368,710 B1 | 4/2002 | Hayes | |
| 11,396,579 B2 | 7/2022 | Lee et al. | |
| 2002/0115817 A1 | 8/2002 | Hayes | |
| 2003/0068453 A1 | 4/2003 | Kong | |
| 2003/0232960 A1 | 12/2003 | Adelman et al. | |
| 2009/0227735 A1 * | 9/2009 | Shih | C08J 5/18 525/54.21 |
| 2009/0270584 A1 | 10/2009 | Endo et al. | |
| 2011/0251342 A1 | 10/2011 | Park et al. | |
| 2012/0177854 A1 | 7/2012 | Lee et al. | |
| 2012/0226014 A1 | 9/2012 | Lee et al. | |
| 2013/0008821 A1 | 1/2013 | Haruta et al. | |
| 2015/0141612 A1 | 5/2015 | Lee et al. | |
| 2015/0148515 A1 | 5/2015 | Kim et al. | |
| 2015/0197598 A1 | 7/2015 | Kim et al. | |
| 2015/0221439 A1 * | 8/2015 | Grosrenaud | C08L 69/00 29/25.42 |
| 2015/0337080 A1 | 11/2015 | Bhattacharjee et al. | |
| 2015/0343746 A1 | 12/2015 | Bhattacharjee et al. | |
| 2015/0353692 A1 | 12/2015 | Bhattacharjee et al. | |
| 2016/0122536 A1 | 5/2016 | Sohn et al. | |
| 2016/0222156 A1 | 8/2016 | Bhattacharjee et al. | |
| 2016/0222157 A1 | 8/2016 | Lee et al. | |
| 2017/0144420 A1 * | 5/2017 | Lim | B32B 27/36 |
| 2018/0162616 A1 * | 6/2018 | Inoue | B32B 27/28 |
| 2018/0355101 A1 | 12/2018 | Jacquel et al. | |
| 2019/0161259 A1 * | 5/2019 | Amedro | B65D 75/002 |
| 2019/0194407 A1 | 6/2019 | Amedro et al. | |
| 2020/0062954 A1 | 2/2020 | Lim et al. | |

FOREIGN PATENT DOCUMENTS

| | | | | |
|---|---|---|---|---|
| JP | 4411556 | | 2/2010 | |
| JP | 2011-025961 | | 2/2011 | |
| JP | 2011-513550 | | 4/2011 | |
| JP | 2013-504650 | | 2/2013 | |
| JP | 5235494 | | 7/2013 | |
| JP | 2013-202939 | | 10/2013 | |
| JP | 2013202940 A | * | 10/2013 | |
| JP | 2015-229242 | | 12/2015 | |
| JP | 2018-034425 | | 3/2018 | |
| KR | 10-2001-0034805 | | 4/2001 | |
| KR | 10-0933242 | | 12/2009 | |
| KR | 10-1169749 | | 7/2012 | |
| KR | 10-1219525 | | 1/2013 | |
| KR | 10-2014-0092113 | | 7/2014 | |
| KR | 20140092113 A | * | 7/2014 | ............ B32B 27/08 |
| KR | 10-1435694 | | 9/2014 | |
| KR | 10-1468937 | | 12/2014 | |
| KR | 20150117954 A | * | 5/2015 | |
| KR | 10-1639629 | | 7/2016 | |
| WO | WO-2015150073 A1 | * | 10/2015 | ............... B32B 1/02 |

OTHER PUBLICATIONS

Espacent Translation of KR-20140092113-A (Year: 2020).*
Espacenet Translation of JP-2013202940-A (Year: 2021).*
International Search Report and Written Opinion for International (PCT) Patent Application No. PCT/KR2017/013546, dated Feb. 12, 2018, 12 pages.
International Search Report and Written Opinion for International (PCT) Patent Application No. PCT/KR2017/013544, dated Feb. 12, 2018, 13 pages.
Extended Search Report for European Patent Application No. 17872962.0, dated Apr. 29, 2020, 10 pages.
Official Action for U.S. Appl. No. 16/344,101, dated Feb. 19, 2021, 17 pages.
Official Action for U.S. Appl. No. 16/344,101, dated Sep. 30, 2021, 24 pages.
Official Action for U.S. Appl. No. 16/344,101, dated Feb. 3, 2022 10 pages.
Notice of Allowance for U.S. Appl. No. 16/344,101, dated Aug. 8, 2022 10 pages.
Notice of Allowance for U.S. Appl. No. 16/344,101, dated Nov. 10, 2022 11 pages.

* cited by examiner

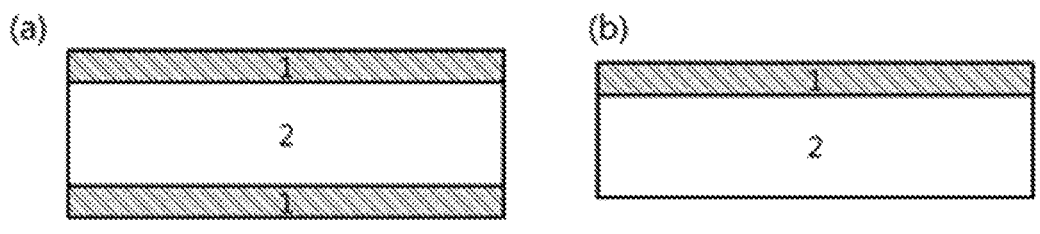

MDO THERMORESISTANT
HEAT-SHRINKABLE MULTILAYER FILM

CROSS-REFERENCE TO RELATED
APPLICATION

This application is a national stage application under 35 U.S.C. 371 and claims the benefit of PCT Application No. PCT/KR2017/013546 having an international filing date of 24 November 2017, which designated the United States, which PCT application claimed the benefit of Korean Patent Application No. 10-2016-0157613 filed on Nov. 24, 2016 with the Korean Intellectual Property Office, the disclosure of which is incorporated herein by reference in its entirety.

The present invention relates to an MDO thermoresistant high shrinkage multilayer film of a copolymer polyester with excellent thermal resistance. More specifically, the present invention relates to an MDO (machine direction orientation) thermoresistant heat-shrinkable multilayer film of a copolymer polyester resin that can be used for labels, cap seals, direct packaging, etc. of various containers.

BACKGROUND OF THE INVENTION

Heat-shrinkable plastic products use heat-shrink properties, and are widely used for films such as a shrink packaging, shrink labels, etc. Among them, polyvinylchloride (PVC), polystyrene, polyester-based plastic films, etc. have been used for labels, cap seals, direct packaging of various containers, etc.

However, a film consisting of polyvinylchloride is subject to regulations because there is a problem of generating hydrogen chloride gas and dioxin-causing materials during incineration. Further, if the product is used as a shrink label of a PET container, etc., there is inconvenience in that the label and container should be separated when the container is recycled. A polystyrene-based film has good operation stability according to a shrink process and has a good product appearance, but due to poor chemical resistance, ink of a special composition should be used when printing thereon. Furthermore, it has a disadvantage in that it shrinks by itself due to insufficient storage stability at room temperature, thus causing size deformation.

Particularly, common MDO heat-shrinkable films are high shrinkage films with low thermal resistance, or have high thermal resistance but low shrinkage. Isosorbide monomers that improve thermal resistance deteriorate elongation of a film.

Therefore, there is a demand for studies on a thermoresistant high shrinkage film capable of simultaneously securing high shrinkage and thermal resistance.

DETAILS OF THE INVENTION

Objects of the Invention

It is an object of the present invention to provide an MDO thermoresistant heat-shrinkable multilayer film that includes multiple skin layers capable of improving thermal resistance formed on a substrate layer capable of providing high shrinkage, and simultaneously has excellent thermal resistance and high shrinkage properties through MD orientation instead of the conventional TD orientation method.

Means for Achieving the Object

The present invention provides an MDO thermoresistant heat-shrinkable multilayer film including a substrate layer, and a skin layer on at least one of the upper side the lower side of the substrate layer, wherein the substrate layer and the skin layer consist of a copolymer polyester resin, which is formed by copolymerization of an acid component including terephthalic acid and a diol component, and has a structure wherein an acid moiety derived from the acid component and a diol moiety derived from the diol component are repeated, the diol component in the substrate layer and the skin layer includes one or more monomers selected from the group consisting of 1,4-cyclohexanedimethanol, neopentyl glycol, diethylene glycol, ethylene glycol, and polyglycol, and the skin layer further includes isosorbide as the diol component, wherein the content of the isosorbide in the skin layer is 1 mol % or more, based on the total diol components included in the skin layer.

The glass transition temperature of the copolymer polyester resin included in the skin layer may be 90° C. or more.

Maximum heat shrinkage at 95 to 100° C. of the MDO thermoresistant heat-shrinkable multilayer film may be 50% or more, and a shrink initiation temperature of the film may be 70° C. or more. The MDO thermoresistant heat-shrinkable multilayer film may have haze of 5% or less.

In the MDO thermoresistant heat-shrinkable multilayer film of the copolymer polyester, the substrate layer and the skin layer may further include one or more selected from the group consisting of a C8-14 aromatic dicarboxylic acid and a C4-12 aliphatic dicarboxylic acid as the acid component.

The substrate layer may further include isosorbide as the diol component, and the content of the isosorbide in the substrate layer may be 50 mol % or less, based on the content of isosorbide included the skin layer.

The skin layer may further include one or more additives selected from the group consisting of a processing aid, an electrostatic agent, a UV absorber, a heat stabilizer, an antistatic agent, a pigment, a flame retardant, a thickener, and an antiblocking agent. Alternatively, a coating layer including one or more additives selected from the group consisting of a processing aid, an electrostatic agent, a UV absorber, a heat stabilizer, an antistatic agent, a pigment, a flame retardant, a thickener, and an antiblocking agent may be further added on the skin layer. The skin layer or the coating layer including such additives may consist of one or more layers.

Meanwhile, the MDO thermoresistant heat-shrinkable multilayer film may be prepared by stretching it by 1.1 to 5 times in the MD (machine direction).

The MDO thermoresistant heat-shrinkable multilayer film of the present invention may have a total film thickness of 10 to 60 μm.

According to another embodiment of the present invention, an MDO thermoresistant multilayer film using the above-explained copolymer polyester resin is provided. The MDO thermoresistant multilayer film includes a substrate layer, and a skin layer on at least one of the upper side the lower side of the substrate layer, wherein the substrate layer and the skin layer consist of copolymer polyester resin, which is formed by copolymerization of an acid component including terephthalic acid and a diol component, and has a structure wherein an acid moiety derived from the acid component and a diol moiety derived from the diol component are repeated, wherein the diol component in the substrate layer and the skin layer includes one or more monomers selected from the group consisting of 1,4-cyclohexanedimethanol, neopentyl glycol, diethylene glycol, ethylene glycol, and polyglycol, and the skin layer further includes isosorbide as the diol component, wherein the content of the isosorbide in the skin layer is 1 mol % or more based on the total diol components included in the skin layer.

The MDO thermoresistant multilayer film may be prepared by stretching it by 1.1 to 5 times in the MD (machine direction).

Effects of the Invention

The MDO thermoresistant high shrinkage multilayer film according to the present invention includes multiple skin layers capable of improving thermal resistance formed on a substrate layer capable of providing high shrinkage, and simultaneously has excellent thermal resistance and high shrinkage properties through MD orientation instead of the conventional TD orientation method, thus obtaining a film with improved transparency.

BRIEF DESCRIPTION OF DRAWINGS

FIG. 1 shows the construction of an MDO thermoresistant multilayer shrink film. In FIG. 1, reference numeral 1 indicates a skin layer, 2 indicates a substrate layer. Also, (a) of FIG. 1 indicates an MDO thermoresistant high shrinkage multilayer film consisting of 3 layers wherein skin layers are positioned on the upper and lower sides of the substrate layer, and (b) of FIG. 1 indicates an MDO thermoresistant high shrinkage multilayer film consisting of 2 layers wherein a skin layer is positioned on one of the upper and lower sides of the substrate layer.

DETAILED DESCRIPTION OF THE EMBODIMENTS

As used herein, terms "first", "second", and the like are used to explain various constructional elements, but they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise", "have", etc. are intended to designate the existence of practiced characteristics, numbers, steps, constructional elements, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to specific disclosures, and that the present invention includes all the modifications, equivalents, or replacements thereof without departing from the spirit and technical scope of the invention.

Hereinafter, an MDO thermoresistant heat-shrinkable multilayer film of copolymer polyester according to a preferable embodiment of the present invention will be explained in more detail.

According to one embodiment of the present invention, an MDO thermoresistant heat-shrinkable multilayer film including a substrate layer, and a skin layer on at least one of the upper side and the lower side of the substrate layer, wherein the substrate layer and the skin layer consist of a copolymer polyester resin which is formed by copolymerization of an acid component including terephthalic acid and a diol component, and has a structure wherein an acid moiety derived from the acid component and a diol moiety derived from the diol component are repeated, wherein the diol component in the substrate layer and the skin layer includes one or more monomers selected from the group consisting of 1,4-cyclohexanedimethanol, neopentyl glycol, diethylene glycol, ethylene glycol, and polyglycol, and the skin layer further includes isosorbide as the diol component, wherein the content of the isosorbide in the skin layer is 1 mol % or more based on the total diol components included in the skin layer, is provided.

Particularly, common MDO heat-shrinkable films are high shrinkage films with low thermal resistance, or have high thermal resistance but low shrinkage. The isosorbide monomers that improve thermal resistance deteriorate elongation of a film. Thus, the present invention provides an MDO thermoresistant high shrinkage multilayer film that not only has improved shrinkage but also overcomes the problem of thermal resistance deterioration, by forming multiple skin layers capable of improving thermal resistance on a first layer (substrate layer, main layer) capable of providing high shrinkage. The existing MDO multilayer film uses additional additives so as to provide functionality, but the MDO thermoresistant heat-shrinkable multilayer film of the present invention consists of a combination capable of providing thermal resistance and improving shrinkage.

The MDO (machine direction orientation) film designates a film prepared by the orientation of extruded resin in the length direction or machine direction (the direction of flow coming out during extrusion).

Meanwhile, the MDO thermoresistant high shrinkage multilayer film of the present invention consists of multilayers of two or more layers. For example, as shown in FIG. 1, it may be an MDO thermoresistant high shrinkage multilayer film consisting of 3 or more layers wherein skin layers are positioned on the upper and lower sides of the substrate layer (see (a) of FIG. 1), or an MDO thermoresistant high shrinkage multilayer film consisting of 2 or more layers wherein a skin layer is positioned on one of the upper and lower sides of the substrate layer (see (b) of FIG. 1).

First, the substrate layer (main layer) may use a polyester resin including one or more monomers such as 1,4-cyclohexanedimethanol, neopentyl glycol, diethylene glycol, ethylene glycol, polyglycol, etc., particularly, as a diol component, which has low thermal resistance but has excellent elongation during MD orientation and high maximum shrinkage.

Further, the skin layer may use a polyester resin essentially including isosorbide with high thermal resistance as a diol component. Among the diol components of the skin layer, the content of isosorbide may be about 1 mol % or more or about 1 mol % to 60 mol %, preferably 3.5 mol % or more or about 3.5 mol % to 58 mol %, or about 5 mol % or more or about 5 mol % to 56 mol %, based on the total diol components. If the content of isosorbide in the skin layer is less than about 1 mol %, the thermal resistance of the film may be deteriorated, and thus, if a high temperature material is used as the filling product (material put in a container using a shrink film, for example, a hot beverage), a failure may be generated due to contact between films with low thermal resistance.

However, if the content of isosorbide in the skin layer increases, due to a high isosorbide content, brittleness may increase and the orientation ratio may decrease, and thus the maximum shrinkage may decrease, and thus it may be preferably used in a content of about 60 mol % or less. As explained, it may be included in the above content range so as to provide excellent thermal resistance, improve maximum shrinkage, shrink initiation temperature, etc., and prevent brittleness and thermal deformation during molding and post-processing.

The ratio of the substrate layer and the skin layer of the MDO thermoresistant heat-shrinkable multilayer film of the present invention may vary according to the isosorbide content of the resin used in the skin layer, and it may be determined on the basis of thermal resistance with a shrink initiation temperature of about 70° C. or more, considering a processing temperature required during printing.

Here, the glass transition temperature (Tg) of the copolymer polyester resin included in the skin layer may be about 85° C. or more, and more preferably 90° C. or more. The maximum heat shrinkage of the film at 95 to 100° C. may be about 50% or more, and the shrink initiation temperature of the film may be about 70° C. or more.

The substrate layer and the skin layer consist of a copolymer polyester resin, which is formed by copolymerization of an acid component including terephthalic acid and a diol component as explained above, and has a structure wherein an acid moiety derived from the acid component and a diol moiety derived from the diol component are repeated.

Meanwhile, the acid component used in the present invention includes terephthalic acid as a main component. That is, the whole acid component may be terephthalic acid, or the acid component may partially include copolymerizable acid components (copolymerizable monomers) selected from the group consisting of a C8-14 aromatic dicarboxylic acid component and a C4-12 aliphatic dicarboxylic acid component in addition to terephthalic acid, so as to improve the properties of the polyester resin.

The C8-14 aromatic dicarboxylic acid component may include aromatic dicarboxylic acid components commonly used in the preparation of a polyester resin such as isophthalic acid, a naphthalenedicarboxylic acid such as 2,6-naphthalenedicarboxylic acid, etc., diphenyl dicarboxylic acid, etc., excluding terephthalic acid, and the C4-12 aliphatic dicarboxylic acid component may include linear, branched, or cyclic aliphatic dicarboxylic acid components commonly used in the preparation of polyester resin such as cyclohexanedicarboxylic acid such as 1,4-cyclohexanedicarboxylic acid, 1,3-cyclohexanedicarboxylic acid, etc. phthalic acid, sebacic acid, succinic acid, isodecyl succinic acid, maleic acid, fumaric acid, adipic acid, glutaric acid, azelaic acid, etc.

The acid component may be used alone or in combinations of two or more. Throughout the specification, the term "terephthalic acid component" is used to include terephthalic acid, alkyl ester (a C1-4 lower alkyl ester such as monomethyl, monoethyl, dimethyl, diethyl, or dibutyl ester, etc.), and/or an acid anhydride thereof, and it reacts with the diol components to form a terephthaloyl moiety. Throughout the specification, the acid moiety and the diol moiety mean residues that remain after hydrogen, hydroxyl groups, or alkoxy groups are removed during the common polyester polymerization reaction of the acid component and diol component.

Further, the diol component used in the substrate layer and the skin layer basically includes one or more diol components selected from the group consisting of 1,4-cyclohexanedimethanol, neopentyl glycol, diethylene glycol, ethylene glycol, and polyglycol. As explained above, the skin layer further includes isosorbide in a predetermined content range, in addition to the above-described diol components.

To the contrary, the substrate layer may not include isosorbide at all, or a small amount of isosorbide may be included in the substrate layer according to the process and production method. However, the content of isosorbide included in the substrate layer may be about 50% or less or about 40% or less, or about 10% to 30%, based on the content of isosorbide included in the skin layer.

Here, among the diol component, as the 1,4-cyclohexanedimethanol, cis-, trans-, or mixtures of both isomers may be used. In order to improve formability or other properties of the polymer, the diol component may optionally include diethylene glycol, etc. The total content of the diol components used in the present invention, i.e., isosorbide and 1,4-cyclohexanedimethanol, neopentyl glycol, ethylene glycol, diethylene glycol, polyglycol, etc., may be within a range that does not exceeds 100 mol %. Particularly, as the remaining component of the diol components, ethylene glycol, etc. may be added so that the sum of total diol components may become 100 mol %.

Further, in the copolymer polyester resin of the present invention, if necessary, one or more of the following diol components may be additionally used. The diol components that can be used may include propane-1,2-diol, 2,2-methyl-1,3-propanediol, 2-methyl-1-3-propanediol, 2-dimethyl-1,3-propanediol, 2-methyl-2-ethyl-1,3-propanediol, 2-methyl-isopropyl-1,3-propanediol, 2-methyl-2-n-propyl-1,3-propanediol, 1,1-ethyl-n-butyl-1,3-propanediol, 2-n-propyl-2-n-butyl-1,3-propanediol, 2,2-di-n-propyl-1,3-propanediol, 2-ethyl-n-propyl-1,3-propanediol, 2-ethyl-isopropyl-1,3-propanediol, 2-methyl-n-butyl-1,3-propanediol, 2,2-diethyl-1,3-propanediol, 1,4-butanediol, 2,3-dimethyl-1,4-butanediol, 2-methyl-1,4-butanediol, 2-ethyl-1,4-butanediol, 2,3,4-trimethyl-1,5-pentanediol, 2-methyl-2-hexyl-1,3-propanediol, 2-butyl-2-ethyl-1,3-propanediol, 3-methyl-1,5-pentanediol, 2-methyl-1,5-pentanediol, 2-methyl-2-hexyl-1,3-propanediol, 2,3-dimethyl-2,3-butanediol, 1,6-hexanediol, 2,2,4,4-tetramethyl-1,3-cyclobutanediol, a polyethylene glycol such as triethylene glycol, etc., an ether glycol or dimer diol such as an alkylene oxide of polypropylene glycol, polyoxy tetramethylene glycol, bisphenol compounds, or derivatives thereof, etc. The content of the diol component added may be controlled so that the sum of the total diol components becomes 100 mol %, within a range where the properties of the polyester resin are not damaged.

In the copolymer polyester resin of the skin layer, one or more additives selected from the group consisting of a processing aid, an electrostatic agent, a UV absorber, a heat stabilizer, an antistatic agent, a pigment, a flame retardant, a thickener, and an antiblocking agent may be included, or an antistatic agent-treated thermoresistant-treated coating layer may be added. The coating layer may further include one or more additives selected from the group consisting of a processing aid, an electrostatic agent, a UV absorber, a heat stabilizer, an antistatic agent, a pigment, a flame retardant, a thickener, and an antiblocking agent. The skin layer or the coating layer including such additives may consist of one or more layers, for example, 5 to 7 layers. The functional additives may be used in the content of about 1 to 5 wt % based on the total weight of the resin components of the skin layer or the coating layer, and within such range, the film may be easily molded and various properties may be provided to the film.

Particularly, if the additives used are inorganic particles, for example, silica-based inorganic particles, the average particle diameter is appropriately about 10 micrometers (μm) or less, more preferably about 5 micrometers (μm) or less so as to maintain the transparency of the film.

Here, compared to using the additives in all layers in the content of about 1 to 5 wt %, if the additives are added only in the skin layer, there are advantages in terms of film appearance (haze and color) and cost reduction due to a decrease in the consumption amount of functional additives while identically maintaining the functionality.

Particularly, in the skin layer of the present invention, about 5% of an antiblocking master batch (M/B) may be used. Since a smaller amount may be used compared to using a master batch in a single layer, the amount of inorganic substance included in the antiblocking master batch decreases to improve transparency of the film, and a material cost reduction effect may be obtained due to a decrease in the use amount of the antiblocking master batch.

Meanwhile, the MDO thermoresistant heat-shrinkable multilayer film may be prepared by stretching it by about 1.1 to about 5 times, about 1.1 to about 4.5 times, or about 1.1 to about 4 times in the MD (machine direction).

Here, the MD orientation device may consist of a preheating roller, an orientation roller, an annealing roller, and a cooling roller. The temperature of the roller orientation device may be generally set to be about 10 to about 30° C. higher than the glass transition temperature for the preheating roller, and about 5 to 20° C. higher for the orientation roller, about 10 to 30° C. lower for the annealing roller, and about 20 to 50° C. lower for the cooling roller, and as the result, uniform orientation is enabled, thus minimizing the deviation.

By different speeds of the orientation rollers, the orientation ratio can be controlled, and for example, when the speed ratio between the first orientation roller and the second orientation roller is about 1:12 to 1:5, preferably about 1:15 to 1:3, the strength and shrinkage of the MDO heat-shrinkable film can be improved.

The MDO thermoresistant heat-shrinkable multilayer film of the present invention may have a total film thickness of about 10 to about 60 μm. Further, since the maximum shrinkage at about 95 to about 100° C. of the MDO thermoresistant heat-shrinkable multilayer film is constant, temperature sensitivity is low, thus preparing uniform products. The TD (transverse direction) shrinkage at about 100° C. is as low as about 5% or less, preferably about 2% or less, and dimensional stability is excellent. Here, the TD (transverse direction) corresponds to the transverse direction (opposite direction of the flow coming out during extrusion) of the extruded resin, and designates the transverse direction of a film. Here, the dimensional stability can be modified according to the annealing conditions of a film after orientation, and as the annealing temperature is similar to or higher than the orientation temperature, or as the annealing speed is slower, a change in TD shrinkage decreases.

The MDO thermoresistant heat-shrinkable multilayer film of the present invention may further include additives commonly used in the technical field to which the present invention pertains, in addition to the above-explained components and compositions.

Meanwhile, according to another embodiment of the invention, an MDO thermoresistant multilayer film using the above-explained copolymer polyester resin is provided. The MDO thermoresistant multilayer film includes a substrate layer, and a skin layer on at least one of the upper side and the lower side of the substrate layer, wherein the substrate layer and the skin layer consist of a copolymer polyester resin which is formed by the copolymerization of an acid component including terephthalic acid and a diol component, and has a structure wherein an acid moiety derived from the acid component and a diol moiety derived from the diol component are repeated, wherein the diol component in the substrate layer and the skin layer includes one or more monomers selected from the group consisting of 1,4-cyclohexanedimethanol, neopentyl glycol, diethylene glycol, ethylene glycol, and polyglycol, and the skin layer further includes isosorbide as the diol component, wherein the content of the isosorbide in the skin layer may be 1 mol % or more or about 1 mol % to 60 mol %, preferably 3.5 mol % or more or about 3.5 mol % to 58 mol %, or about 5 mol % or more or about 5 mol % to 56 mol %, based on the total diol component included in the skin layer.

The MDO thermoresistant multilayer film may be prepared by stretching it by about 1.1 to about 5 times, about 1.1 times to about 4.5 times, or about 1.1 times to about 4 times in the MD (machine direction).

The composition, properties, and preparation method of the copolymer polyester resin are as explained above.

Hereinafter, preferable examples are presented for better understanding of the present invention, but the following examples are presented only as illustrations of the present invention and the scope of the present invention is not limited thereby.

EXAMPLES

Preparation Examples 1 to 9: Polymerization Process of Polyester Resin

Based on 100 mol % of terephthalic acid, with the compositions of the remaining components as shown in the following Table 1, terephthalic acid and 1,4-cyclohexandimethanol (CHDM), neopentyl glycol (NPG), ethylene glycol (EG), diethylene glycol (DEG), and isosorbide (ISB) were used to prepare polyester resins (Resins 1 to 9) of Preparation Examples 1 to 9, which constitute the substrate layer or skin layer in Examples 1 to 4 and Comparative Examples 1 to 4.

Here, the residual rate of 1,4-cyclohexanedimethanol (CHDM) is about 95% to 100%, the residual rates of neopentyl glycol (NPG) and isosorbide (ISB) are about 55% to about 80%, and diethylene glycol (DEG) has a residual rate of about 80% to 95% according to the additional introduction together with a natural production amount, and the introduction mole ratio was changed at the mole ratio (G/A) of total diol components based on the acid component of about 1.2 to 3.

For the preparation of the polyester resin, basic reaction conditions excluding the introduction amount are as follows.

The raw materials were mixed in a 3 kg batch reactor and reacted while slowly raising the temperature to about 255 to 270° C.

Here, generated water was discharged outside of the system to progress an ester reaction. When the generation and discharge of water was finished, the rectant was transferred to a polycondensation reactor, to which a stirrer, a cooling condenser, and vacuum system were attached. A catalyst, a stabilizer, and a coloring agent were added to the esterification reactant at an appropriate ratio. Then, while raising the temperature inside of the reactor to about 240° C. to 285° C., the pressure was primarily reduced from atmospheric pressure to about 50 mmHg to remove ethylene glycol with a low vacuum reaction for about 20 minutes, and was slowly reduced again to about 0.1 mmHg. The polycondensation reaction was progressed under high vacuum until a desired intrinsic viscosity was reached, thus preparing the copolymer polyester resin.

Using the prepared copolymer polyester resin, an MDO heat-shrinkable film was prepared. The glass transition temperature (Tg) of polyester resin was measured using Mettler Toledo Differential Scanning calorimetry of TA Instruments. Here, the temperature rise speed was about 10° C./min, and a $2^{nd}$ Tg value excluding thermal history was shown.

Further, for the polyester resin, compositional analysis was conducted using

NMR as follows, and the compositional analysis result of the resin is shown in the following Table 1.

Compositional Analysis (NMR)

It was measured in a Fourier-transform (for higher resolution and faster scanning) mode using ECA 600, Jeol (600 MHz, H-NMR) equipment. Here, for the pretreatment of the sample, about 15 mg of a pellet sample was put in an NMR tube (quartz, NMR inactive), and about 0.7 mL of chloroform was put therein to dissolve the sample, which was used for analysis.

The measurement result was the composition result of diol components based on 100 mol % of acid, and shown in the following Table 1 as a diol component. For reference, a trace amount of diethylene glycol (DEG) is detected due to side reactions, even if not introduced. In general, the generation of DEG is known as one of the common side-reaction results of polyester polymerization.

Examples 1 to 4 and Comparative Examples 1 to 5:
Preparation of MOO Thermoresistant
Heat-Shrinkable Multilayer Film Heat-shrinkable films were prepared with the constructions shown in the following Table 2. First, a skin layer and a substrate layer were respectively extruded by a multilayer extrusion process of melt extrusion with different extruders and melt adhesion with a roll.

Here, it is preferable to control each barrel temperature so that the melt viscosities of the skin layer and substrate layer become similar. In the case of the substrate layer, the temperature was controlled to about 250 to about 255° C. on the basis of polymer temperature. The skin layer was extruded while adjusting the viscosities of the substrate layer and the skin layer to be similar so as to make the thickness of the molded product uniform, considering the thermal resistance and viscosity of the resin constituting the skin layer. In general, a skin layer with high thermal resistance was molded while raising the extrusion temperature compared to the substrate layer. For example, Resin 4 was extruded at about 260° C., Resin 7 was extruded at about 265° C., and Resin 8 was extruded at about 270° C.

The sheet extruded from a T-die was cooled by a cooling roller for take-off of which temperature was adjusted to about 40 to 90° C. Thereafter, the sheet was stretched by about 1.1 to about 4 times in the MD by in a roller orientation device having temperature of about 80 to 140° C., and wound in a winder to obtain a film roll.

TABLE 1

| | | Resin 1 | Resin 2 | Resin 3 | Resin 4 | Resin 5 | Resin 6 | Resin 7 | Resin 8 | Resin 9 |
|---|---|---|---|---|---|---|---|---|---|---|
| Diol composition (mol %) | CHDM | 23 | 30 | — | 50 | 48 | 48 | 47 | 31 | 30 |
| | NPG | — | — | 21 | — | — | — | — | — | — |
| | EG | 65 | 67 | 76 | 39.2 | 36.8 | 26.4 | 19 | 24.5 | 12 |
| | DEG | 12 | 3 | 3 | 1.3 | 1.2 | 1.6 | 1 | 1.5 | 3 |
| | ISB | — | — | — | 9.5 | 14 | 24 | 33 | 43 | 55 |
| Resin Tg (° C.) | | 70 | 80 | 80 | 95 | 100 | 110 | 120 | 130 | 145 |

TABLE 2

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Kind of resin | First skin layer | Resin 8 | Resin 4 | Resin 9 | Resin 7 | — | — | — | — | Resin 1 |
|  | Substrate layer (main layer) | Resin 1 | Resin 1 | Resin 1 | Resin 2 | Resin 4 | Resin 6 | Resin 1 | Resin 3 | Resin 4 |
|  | Second skin layer | Resin 8 | Resin 4 | Resin 5 | Resin 4 | — | — | — | — | Resin 1 |
| Constructional ratio (total: 10) | First skin layer | 0.5 | 1 | 0.5 | 0.5 | — | — | — | — | 1 |
|  | Substrate layer (main layer) | 9 | 8 | 8 | 8.5 | 10 | 10 | 10 | 10 | 8 |
|  | Second skin layer | 0.5 | 1 | 1.5 | 1 | — | — | — | — | 1 |
| Tg (° C.) | First skin layer | 130 | 95 | 145 | 120 | — | — | — | — | 70 |
|  | Substrate layer (main layer) | 70 | 70 | 70 | 80 | 95 | 110 | 70 | 80 | 95 |
|  | Second skin layer | 130 | 95 | 100 | 95 | — | — | — | — | 70 |
| additives |  | X | ○ | X | ○ | ○ | ○ | ○ | ○ | ○ |

Experimental Example

For the heat-shrinkable films prepared according to Examples 1 to 4 and Comparative Examples 1 to 5, the properties were evaluated as follows. The results of measuring the properties are shown in the following Table 3.

a) Haze

The haze of the film was measured using a haze meter of Nippon Denshoku (NDH 7000).

as to be heat shrunken, and then the lengths of the transverse direction (TD) and the machine direction (MD) of the sample were measured. The heat shrinkage was calculated according to the following Formula 1. Here, the machine direction (MD) corresponds to the orientation direction of the film, and the transverse direction (TD) corresponds to the opposite direction to the orientation direction of the film.

Heat shrinkage (%)=100×(length before shrinkage−length after shrinkage)/(length before shrinkage)   [Formula 1]

TABLE 3

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Haze (film) |  | 2% or less | 3% or less | 3% or less | 3% or less | 4%~7% | 4%~7% | 4%~7% | 4%~7% | 3% or less |
| Total thickness of film (μm) |  | 21 | 20 | 20 | 24 | 25 | 35 | 18 | 22 | 25 |
| Deformation of film at 65° C. |  | Not deformed | Not deformed | Not deformed | Not deformed | Not deformed | Not deformed | deformed | deformed | deformed |
| Maximum shrinkage (%) | MD-100° C. | 63 | 65 | 63 | 54 | 36 | 31 | 70 | 63 | 45 |
|  | TD-100° C. | 0 | 1 | 0 | 0 | 2 | 0 | 0 | 1 | 2 | b) Deformation of Molded Product (Film) Under Condition of 65° C.

Since a raised printing temperature was about 62 to 65° C., and the temperature during high temperature filling of beverage was about 60 to 70° C., the deformation rate of the MD oriented film was measured under the condition of the mean temperature of about 65° C., to evaluate thermal resistance.

Here, the film was cut into squares of about 10 cm×10 cm, and put in a water bath of about 65° C. for about 15 seconds to evaluate whether or not deformation occurred.

c) Heat Shrinkage (%, at 75° C., 100° C.)

The film was cut into squares of 10 cm×10 cm, and put in a water bath for about 15 to about 20 seconds at a temperature of about 75° C. or about 100° C. as described below so As shown in Table 3, the copolymer polyester MDO thermoresistant heat-shrinkable multilayer films of Examples 1 to 4 prepared according to the present invention have improved maximum shrinkage, and have remarkably improved transparency by adding an antiblocking master batch (M/B) to the skin layer. Particularly, the heat-shrinkable multilayer film of Example 1, wherein a resin with high shrinkage is used in the substrate layer and a resin improving thermal resistance is included in the skin layer, shows that high maximum shrinkage of 63% can be obtained. Also, it is confirmed that the heat-shrinkable multilayer film of Example 1 was not deformed under a 65° C. condition, and thus it can be stably used even if the temperature of a filling product is high. In Example 2, by controlling the contents of CHDM and ISB, shrinkage was improved to 65%, which is higher than that of Example 1.

Further, according to Examples 2 and 3, it can be seen that the thickness of a skin layer can be variously changed according to the thermal resistance of the resin constituting the skin layer and the desired thermal resistance degree. Also, it is confirmed that maximum shrinkage is similar if the thickness and the components of a substrate layer are identical. In Example 4, the shrinkage is lower than in Example 3 due to the property of the resin of the substrate layer, even if the thickness of the substrate layer is thicker than in Example 3, since the maximum shrinkage differs according to the shrinkage of the resin constituting the substrate layer. Further, it is directly confirmed that haze of the film is low and transparency increases in Examples 2 and 4, wherein the additives are added to the skin layer in the content of 4% based on the components constituting the skin layer, compared to adding functional additives to a single layer in the content of 4% of all components.

To the contrary, in the case of the heat-shrinkable films of Comparative Examples 1 to 5 using the copolymer polyester resin prepared by the existing method, deformation occurred at the printing processing temperature or the maximum shrinkage was remarkably lowered. Particularly, in the monolayer MD shrink films of Comparative Examples 1 to 4, 65° C. deformation of the film and change in shrinkage can be confirmed according to the thermal resistance of the polyester resin constituting the shrink film. Among them, in the case of Comparative Examples 1 and 2, it can be seen that isosorbide improving the thermal resistance deteriorates elongation and thus deteriorates maximum shrinkage to a certain degree. In Comparative Examples 3 and 4, high maximum shrinkage is exhibited, but thermal resistance is remarkably lowered, and deformation of the film is generated under the 65° C. condition. Further, in Comparative Example 5, the resin including 0.5 mol % of isosorbide is used in the substrate layer to apply as a film with a high glass transition temperature, and the resin that does not include isosorbide is used in the skin layer to combine a film with a low glass transition temperature and prepare an MDO thermoresistant heat-shrinkable multilayer film. The MDO thermoresistant heat-shrinkable multilayer film of Comparative Example 5 shows that the maximum shrinkage is lowered to 45% and the deformation of the film is generated under the 65° C. condition, simultaneously.

What is claimed is:

1. An MDO thermoresistant heat-shrinkable multilayer film comprising:
    a substrate layer, and
    a skin layer on at least one of the upper and the lower sides of the substrate layer,
    wherein the substrate layer and the skin layer each consist of a copolymer polyester resin, which is formed by copolymerization of an acid component comprising terephthalic acid and a diol component, and has a structure wherein an acid moiety derived from the acid component and a diol moiety derived from the diol component are repeated,
    wherein the diol component in the substrate layer comprises diethylene glycol, ethylene glycol, and one or more monomers selected from the group consisting of 1,4-cyclohexanedimethanol and neopentyl glycol,
    wherein the diol component in the skin layer comprises 1,4-cyclohexanedimethanol, diethylene glycol, ethylene glycol, and isosorbide, and
    wherein the content of the isosorbide in the skin layer is 1 mol % to 60 mol % based on the total diol components included in the skin layer,
    wherein the substrate layer does not comprise isosorbide as the diol component,
    wherein the glass transition temperature ($T_g$) of the copolymer polyester resin included in the skin layer is 85° C. or more, and the $T_g$ of the copolymer polyester resin included in the substrate layer is 70° C. to 80° C., and
    wherein the film is prepared by stretching it by 2 to 5 times in the MD (machine direction),
    wherein a maximum heat shrinkage of the film in the MD at 95 to 100° C. is 50% or more, and a shrinkage of the film in the transverse direction (TD) at 100° C. is 5% or less,
    wherein a shrink initiation temperature of the film is 70° C. or more,
    wherein the film has haze of 5% or less, and
    wherein the total thickness of the film is 10 to 60 µm.

2. The MDO thermoresistant heat-shrinkable multilayer film according to claim 1, wherein the acid component further comprises one or more selected from the group consisting of a C8-14 aromatic dicarboxylic acid component and a C4-12 aliphatic dicarboxylic acid component.

3. The MDO thermoresistant heat-shrinkable multilayer film according to claim 1, wherein the diol component in the skin layer comprises 30 mol % to 50 mol % of 1,4-cyclohexanedimethanol, 1 mol % to 3 mol % of diethylene glycol, and 9.5 mol % to 55 mol % of isosorbide based on the total diol components included in the skin layer, and ethylene glycol is included as the residue of the diol component in the skin layer,
    wherein the diol component in the substrate layer comprises 3 mol % to 12 mol % of diethylene glycol, and 23 mol % to 30 mol % of 1,4-cyclohexanedimethanol based on the total diol components included in the substrate layer, and ethylene glycol is included as the residue of the diol component in the substrate layer, and
    wherein the substrate layer does not comprise isosorbide.

4. The MDO thermoresistant heat-shrinkable multilayer film according to claim 1, further comprising a coating layer comprising one or more additives selected from the group consisting of a processing aid, an electrostatic agent, a UV absorber, a heat stabilizer, an antistatic agent, a pigment, a flame retardant, a thickener, and an antiblocking agent, on the skin layer.

5. The MDO thermoresistant heat-shrinkable multilayer film of claim 1, wherein the glass transition temperature ($T_g$) of the copolymer polyester resin included in the skin layer is 95° C. to 130° C.

* * * * *